US012431060B2

(12) United States Patent
Kim et al.

(10) Patent No.: US 12,431,060 B2
(45) Date of Patent: Sep. 30, 2025

(54) DISPLAY APPARATUS AND A METHOD OF DRIVING A DISPLAY PANEL USING THE SAME

(71) Applicant: SAMSUNG DISPLAY CO., LTD., Yongin-si (KR)

(72) Inventors: Hun-Bae Kim, Asan-si (KR); Garam Kim, Suwon-si (KR); Yong-Gu Kang, Hwaseong-si (KR); Jihoon Kim, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/887,663

(22) Filed: Aug. 15, 2022

(65) Prior Publication Data

US 2023/0154380 A1 May 18, 2023

(30) Foreign Application Priority Data

Nov. 15, 2021 (KR) ........................ 10-2021-0156888

(51) Int. Cl.
*G09G 3/20* (2006.01)
*G09G 3/3233* (2016.01)

(52) U.S. Cl.
CPC ......... *G09G 3/2096* (2013.01); *G09G 3/2007* (2013.01); *G09G 3/3233* (2013.01); *G09G 2300/0819* (2013.01); *G09G 2300/0842* (2013.01); *G09G 2310/08* (2013.01);
(Continued)

(58) Field of Classification Search
None
See application file for complete search history.

(56) References Cited

U.S. PATENT DOCUMENTS

2007/0229413 A1* 10/2007 Hara .................... G09G 3/3258 345/76
2019/0333453 A1* 10/2019 Seki ....................... G09G 3/342
2019/0340977 A1 11/2019 Park et al.
(Continued)

FOREIGN PATENT DOCUMENTS

KR 10-2019-0128018 A 11/2019
KR 10-2021-0035370 4/2021

OTHER PUBLICATIONS

Office Action dated Mar. 10, 2025 from the Korean Intellectual Property Office (KIPO) for corresponding Korean Patent Application No. 10-2021-0156888.

*Primary Examiner* — Benjamin C Lee
*Assistant Examiner* — Emily J Frank
(74) *Attorney, Agent, or Firm* — F. CHAU & ASSOCIATES, LLC

(57) ABSTRACT

A display apparatus including: a display panel including an emission line and a pixel electrically connected to the emission line; an emission driver configured to output an emission signal to the emission line; and a driving controller configured to determine a light emission cycle, wherein the light emission cycle is a number of light emissions in a single frame of the emission signal, wherein the driving controller is configured to determine a luminance according to a user luminance setting and a grayscale value of input image data, to determine the light emission cycle corresponding to a range of the luminance and to determine an off ratio according to the luminance, wherein the off ratio is a ratio of turned-off gate lines to a total number of the gate lines.

13 Claims, 15 Drawing Sheets

(52) U.S. Cl.
CPC ............... *G09G 2320/0247* (2013.01); *G09G 2320/0626* (2013.01); *G09G 2330/021* (2013.01)

(56) References Cited

U.S. PATENT DOCUMENTS

| | | | | |
|---|---|---|---|---|
| 2020/0082768 | A1* | 3/2020 | Oh | G09G 3/3291 |
| 2021/0090507 | A1* | 3/2021 | Hwang | G09G 3/3291 |
| 2022/0114956 | A1* | 4/2022 | Lee | G09G 3/3225 |
| 2022/0165210 | A1* | 5/2022 | Yoon | G09G 3/32 |
| 2023/0335069 | A1* | 10/2023 | Liu | G09G 3/3406 |

* cited by examiner

| | AID CYCLE | | | AOR | | |
|---|---|---|---|---|---|---|
| | HIGH LUMINANCE | MIDDLE LUMINANCE | LOW LUMINANCE | HIGH LUMINANCE | MIDDLE LUMINANCE | LOW LUMINANCE |
| 60NS | 4-CYCLES | 4-CYCLES | 4-CYCLES | 16% | 16~96% | 96% |
| 60HS | 4-CYCLES | 4-CYCLES | 4-CYCLES | 16% | 16~96% | 96% |
| 120HS | 4-CYCLES | 4-CYCLES | 4-CYCLES | 16% | 16~96% | 96% |

| | AID CYCLE | | | AOR | | |
|---|---|---|---|---|---|---|
| | HIGH LUMINANCE | MIDDLE LUMINANCE | LOW LUMINANCE | HIGH LUMINANCE | MIDDLE LUMINANCE | LOW LUMINANCE |
| 60NS | 4-CYCLES | 4-CYCLES | 4-CYCLES | 16% | 16~96% | 96% |
| 60HS | 2-CYCLES | 4-CYCLES | 4-CYCLES | 16% | 16~96% | 96% |
| 120HS | 4-CYCLES | 8-CYCLES | 4-CYCLES | 16% | 16~96% | 96% |

FIG. 17

| | AID CYCLE | | | AOR | | | AOFF | | |
|---|---|---|---|---|---|---|---|---|---|
| | HIGH LUMINANCE | MIDDLE LUMINANCE | LOW LUMINANCE | HIGH LUMINANCE | MIDDLE LUMINANCE | LOW LUMINANCE | HIGH LUMINANCE | MIDDLE LUMINANCE | LOW LUMINANCE |
| 60NS | 4-CYCLES | 4-CYCLES | 4-CYCLES | 16% | 16~96% | 96% | 4% (x4) | 4% (x4) : 24% (x4) | 24% (x4) |
| 60HS | 4-CYCLES | 4-CYCLES | 4-CYCLES | 8% | 8~48% | 48% | 4% (x2) | 4% (x2) : 24% (x2) | 24% (x2) |
| 120HS | 4-CYCLES | 4-CYCLES | 4-CYCLES | 16% | 16~96% | 96% | 4% (x4) | 4% (x4) : 24% (x4) | 24% (x4) |

FIG. 18

| | AID CYCLE | | | AOR | | | AOFF | | |
|---|---|---|---|---|---|---|---|---|---|
| | HIGH LUMINANCE | MIDDLE LUMINANCE | LOW LUMINANCE | HIGH LUMINANCE | MIDDLE LUMINANCE | LOW LUMINANCE | HIGH LUMINANCE | MIDDLE LUMINANCE | LOW LUMINANCE |
| 60NS | 4-CYCLES | 4-CYCLES | 4-CYCLES | 16% | 16~96% | 96% | 4% (x4) | 4% (x4) ⋮ 24% (x4) | 24% (x4) |
| 60HS | 4-CYCLES | 8-CYCLES | 4-CYCLES | 16% | 16~96% | 96% | 8% (x2) | 4% (x4) ⋮ 24% (x4) | 48% (x2) |
| 120HS | 2-CYCLES | 4-CYCLES | 2-CYCLES | 16% | 16~96% | 96% | 8% (x2) | 4% (x4) ⋮ 24% (x4) | 48% (x2) |

FIG. 19

| | AID CYCLE | | | AOR | | | AOFF | | |
|---|---|---|---|---|---|---|---|---|---|
| | HIGH LUMINANCE | MIDDLE LUMINANCE | LOW LUMINANCE | HIGH LUMINANCE | MIDDLE LUMINANCE | LOW LUMINANCE | HIGH LUMINANCE | MIDDLE LUMINANCE | LOW LUMINANCE |
| 60NS | 2-CYCLES | 2-CYCLES | 2-CYCLES | 16% | 16~96% | 96% | 8% (x2) | 8% (x2)<br>:<br>48% (x2) | 48% (x2) |
| 60HS | 4-CYCLES | 4-CYCLES | 4-CYCLES | 16% | 16~96% | 96% | 8% (x2) | 8% (x2)<br>:<br>48% (x2) | 48% (x2) |
| 120HS | 2-CYCLES | 2-CYCLES | 2-CYCLES | 16% | 16~96% | 96% | 8% (x2) | 8% (x2)<br>:<br>48% (x2) | 48% (x2) |

FIG. 20

| | A:D CYCLE | | | AOR | | | AOFF | | |
|---|---|---|---|---|---|---|---|---|---|
| | HIGH LUMINANCE | MIDDLE LUMINANCE | LOW LUMINANCE | HIGH LUMINANCE | MIDDLE LUMINANCE | LOW LUMINANCE | HIGH LUMINANCE | MIDDLE LUMINANCE | LOW LUMINANCE |
| 60NS | 2-CYCLES | 2-CYCLES | 2-CYCLES | 16% | 16~96% | 96% | 8% (x2) | 8% (x2) : 48% (x2) | 48% (x2) |
| 60HS | 4-CYCLES | 4-CYCLES | 4-CYCLES | 8% | 8~48% | 48% | 4% (x2) | 4% (x2) : 24% (x2) | 24% (x2) |
| 120HS | 4-CYCLES | 4-CYCLES | 4-CYCLES | 16% | 16~96% | 96% | 4% (x4) | 4% (x4) : 24% (x4) | 24% (x4) |

DISPLAY APPARATUS AND A METHOD OF DRIVING A DISPLAY PANEL USING THE SAME

CROSS-REFERENCE TO RELATED APPLICATION

This application claims priority under 35 U.S.C. § 119 to Korean Patent Application No. 10-2021-0156888, filed on Nov. 15, 2021 in the Korean Intellectual Property Office (KIPO), the disclosure of which is incorporated by reference herein in its entirety.

TECHNICAL FIELD

Embodiments of the present inventive concept relate to a display apparatus and a method of driving a display panel using the display apparatus.

DESCRIPTION OF THE RELATED ART

A display apparatus (or display device) is an output device for presentation of information in visual form. Generally, a display apparatus includes a display panel and a display panel driver. The display panel includes a plurality of gate lines (or scan lines), a plurality of data lines, a plurality of emission lines and a plurality of pixels connected to the gate lines, data lines and emission lines. The display panel driver includes a gate driver, a data driver, an emission driver and a driving controller. The gate driver outputs gate signals to the gate lines. The data driver outputs data voltages (or data signals) to the data lines. The emission driver outputs emission signals to the emission lines. The driving controller controls the gate driver, the data driver and the emission driver.

For example, a light emitting element of the pixel may emit light once in a single frame. However, when the light emitting element emits light once in a single frame, a flicker may occur. To prevent flicker, the light emitting element of the pixel may emit light multiple times in a single frame. However, when the light emission is changed from one time per frame to multiple times per frame, a change in color may be recognized by a viewer of the display apparatus. In addition, when the light continues to be emitted multiple times in a single frame, the color may rapidly change.

SUMMARY

Embodiments of the present inventive concept provide a display apparatus for enhancing a display quality of a display panel.

Embodiments of the present inventive concept also provide a method of driving the display panel using the display apparatus.

In an embodiment of the inventive concept, there is provided a display apparatus including: a display panel including an emission line and a pixel electrically connected to the emission line; an emission driver configured to output an emission signal to the emission line; and a driving controller configured to determine a light emission cycle, wherein the light emission cycle is a number of light emissions in a single frame of the emission signal, wherein the driving controller is configured to determine a luminance according to a user luminance setting and a grayscale value of input image data, to determine the light emission cycle corresponding to a range of the luminance and to determine an off ratio according to the luminance, wherein the off ratio is a ratio of turned-off gate lines to a total number of the gate lines.

The driving controller is configured to determine a first light emission cycle corresponding to a first luminance range, a second light emission cycle different from the first light emission cycle and corresponding to a second luminance range and a third light emission cycle different from the second light emission cycle and corresponding to a third luminance range, wherein the second luminance range includes luminances less than luminances of the first luminance range and the third luminance range include luminances less than the luminances of the second luminance range.

The second light emission cycle is greater than the first light emission cycle.

The third light emission cycle is less than the second light emission cycle.

The third light emission cycle is greater than the first light emission cycle.

The first light emission cycle is two, the second light emission cycle is eight and the third light emission cycle is four.

A luminance point at which the off ratio is changed and a luminance point at which the light emission cycle is changed are substantially the same as each other.

In an embodiment of the inventive concept, there is provided a display apparatus including: a display panel including an emission line and a pixel electrically connected to the emission line; an emission driver configured to output an emission signal to the emission line; and a driving controller configured to determine a light emission cycle, wherein the light emission cycle is a number of light emissions in a single frame of the emission signal, wherein the driving controller is configured to determine a luminance according to a user luminance setting and a grayscale value of input image data, to determine an off ratio according to the luminance and to determine the light emission cycle corresponding to a range of the off ratio, wherein the off ratio is a ratio of turned-off gate lines to a total number of the gate lines, wherein the driving controller is configured to determine a first light emission cycle corresponding to a first range of the off ratio, a second light emission cycle different from the first light emission cycle and corresponding to a second range of the off ratio and a third light emission cycle different from the second light emission cycle and corresponding to a third range of the off ratio, and wherein the second range of the off ratio includes off ratios greater than off ratios of the first range of the off ratio and the third range of the off ration includes off ratios greater than the off ratios of the second range of the off ratio.

In an embodiment of the inventive concept, there is provided a display apparatus including: a display panel including an emission line and a pixel electrically connected to the emission line; an emission driver configured to output an emission signal to the emission line; and a driving controller configured to determine a light emission cycle, wherein the light emission cycle is a number of light emissions in a single frame of the emission signal, wherein the driving controller is configured to determine the light emission cycle according to a driving mode, a driving frequency and a luminance and to determine an off ratio according to the luminance, wherein the off ratio is a ratio of turned-off gate lines to a total number of the gate lines, wherein the driving controller is configured to determine a first light emission cycle corresponding to a first mode, a first frequency and a high luminance range, a second light emission cycle corresponding to the first mode, the first frequency and a middle luminance range and a third light emission cycle corresponding to the first mode, the first frequency and a low luminance range, wherein the driving controller is configured to determine a fourth light emission cycle corresponding to a second mode, the first frequency and the high luminance range, a fifth light emission cycle corresponding to the second mode, the first frequency and the middle luminance range and a sixth light emission cycle corresponding to the second mode, the first frequency and the low luminance range, and wherein the driving controller is configured to determine a seventh light emission cycle corresponding to the second mode, a second frequency greater than the first frequency and the high luminance range, an eighth light emission cycle corresponding to the second mode, the second frequency and the middle luminance range and a ninth light emission cycle corresponding to the second mode, the second frequency and the low luminance range.

A first active frame having a first length and a second active frame having the first length are sequentially and continuously output in the first mode and in the first frequency.

A first active frame having a second length less than the first length, a first off frame having the second length, a second active frame having the second length and a second off frame having the second length are sequentially and continuously output in the second mode and in the first frequency, and wherein a first active frame having the second length, a second active frame having the second length, a third active frame having the second length and a fourth active frame having the second length are sequentially and continuously output in the second mode and in the second frequency.

The seventh light emission cycle is same as the fourth light emission cycle, wherein the eighth light emission cycle is same as the fifth light emission cycle, and wherein the ninth light emission cycle is same as the sixth light emission cycle.

The first light emission cycle is four, the second light emission cycle is four, the third light emission cycle is four, the fourth light emission cycle is four, the fifth light emission cycle is four, the sixth light emission cycle is four, the seventh light emission cycle is four, the eighth light emission cycle is four and the ninth light emission cycle is four.

The first light emission cycle is two, the second light emission cycle is two, the third light emission cycle is two, the fourth light emission cycle is four, the fifth light emission cycle is four, the sixth light emission cycle is four, the seventh light emission cycle is four, the eighth light emission cycle is four and the ninth light emission cycle is four.

The seventh light emission cycle is greater than the fourth emission cycle, and wherein the eighth light emission cycle is greater than the fifth emission cycle.

The first light emission cycle is four, the second light emission cycle is four, the third light emission cycle is four, the fourth light emission cycle is two, the fifth light emission cycle is four, the sixth light emission cycle is four, the seventh light emission cycle is four, the eighth light emission cycle is eight and the ninth light emission cycle is eight.

The seventh light emission cycle is less than the fourth emission cycle, wherein the eighth light emission cycle is less than the fifth emission cycle, and wherein the ninth light emission cycle is less than the sixth emission cycle.

The eighth light emission cycle is greater than the seventh emission cycle.

The first light emission cycle is four, the second light emission cycle is four, the third light emission cycle is four, the fourth light emission cycle is four, the fifth light emission cycle is eight, the sixth light emission cycle is four, the seventh light emission cycle is two, the eighth light emission cycle is four and the ninth light emission cycle is two.

The seventh light emission cycle is same as the first emission cycle, wherein the eighth light emission cycle is same as the second emission cycle, wherein the ninth light emission cycle is same as the third emission cycle, wherein the seventh light emission cycle is different from the fourth emission cycle, wherein the eighth light emission cycle is different from the fifth emission cycle, and wherein the ninth light emission cycle is different from the sixth emission cycle.

The first light emission cycle is two, the second light emission cycle is two, the third light emission cycle is two, the fourth light emission cycle is four, the fifth light emission cycle is four, the sixth light emission cycle is four, the seventh light emission cycle is two, the eighth light emission cycle is two and the ninth light emission cycle is two.

In an embodiment of the inventive concept, there is provided a method of driving a display panel, the method including: determining a luminance according to a user luminance setting and a grayscale value of input image data; determining a light emission cycle, which is a number of light emissions in a single frame of an emission signal, corresponding to a range of the luminance; determining an off ratio, which is a ratio of turned-off gate lines among a total number of gate lines, according to the luminance; and outputting the emission signal to an emission line electrically connected to a pixel, wherein the determining the light emission cycle includes: determining a first light emission cycle corresponding to a first luminance range, a second light emission cycle different from the first light emission cycle and corresponding to a second luminance range and a third light emission cycle different from the second light emission cycle and corresponding to a third luminance range, wherein the second luminance range has luminances less than luminances of the first luminance range and the third luminance range has luminances less than the luminances of the second luminance range.

In an embodiment of the inventive concept, there is provided a display apparatus including: a display panel including an emission line and a pixel connected to the emission line; an emission driver configured to output an emission signal to the emission line; and a driving controller configured to determine a luminance based on a luminance setting, determine a number of light emissions in a single frame of the emission signal for a range of the luminance and determine an off ratio based on the luminance, wherein the off ratio is a ratio of turned-off gate lines to a total number of the gate lines.

In the display apparatus and the method of driving the display panel according to embodiments of the present inventive concept, the number of light emissions (e.g., the light emission cycle, AID CYCLE) of the emission signal may be properly varied according to the luminance range of the display image or the ratio (e.g., the off ratio, AOR) of the turned-off gate lines among the total gate lines. Thus, the color shift generated when the luminance is changed may be effectively controlled and the electromagnetic interference (EMI) characteristics and the power consumption may be optimized.

In addition, the number of light emissions of the emission signal may be properly varied according to the driving mode, the driving frequency and the luminance. Thus, the switching flicker generated when the driving mode is switched may be prevented and the display quality characteristics for the frequencies and the luminance ranges may be enhanced.

Therefore, the display quality of the display panel may be enhanced.

BRIEF DESCRIPTION OF THE DRAWINGS

The above and other features of the present inventive concept will become more apparent by describing in detail embodiments thereof with reference to the accompanying drawings, in which:

FIG. 17 is another table illustrating AID CYCLEs determined by the driving controller of FIG. 1 according to the driving mode, the driving frequency and the luminance:

FIG. 18 is another table illustrating AID CYCLEs determined by the driving controller of FIG. 1 according to the driving mode, the driving frequency and the luminance;

FIG. 19 is another table illustrating AID CYCLEs determined by the driving controller of FIG. 1 according to the driving mode, the driving frequency and the luminance; and FIG. 20 is another table illustrating AID CYCLEs determined by the driving controller of FIG. 1 according to the driving mode, the driving frequency and the luminance.

DETAILED DESCRIPTION OF THE INVENTIVE CONCEPT

Hereinafter, the present inventive concept will be explained in detail with reference to the accompanying drawings.

Figure 1:
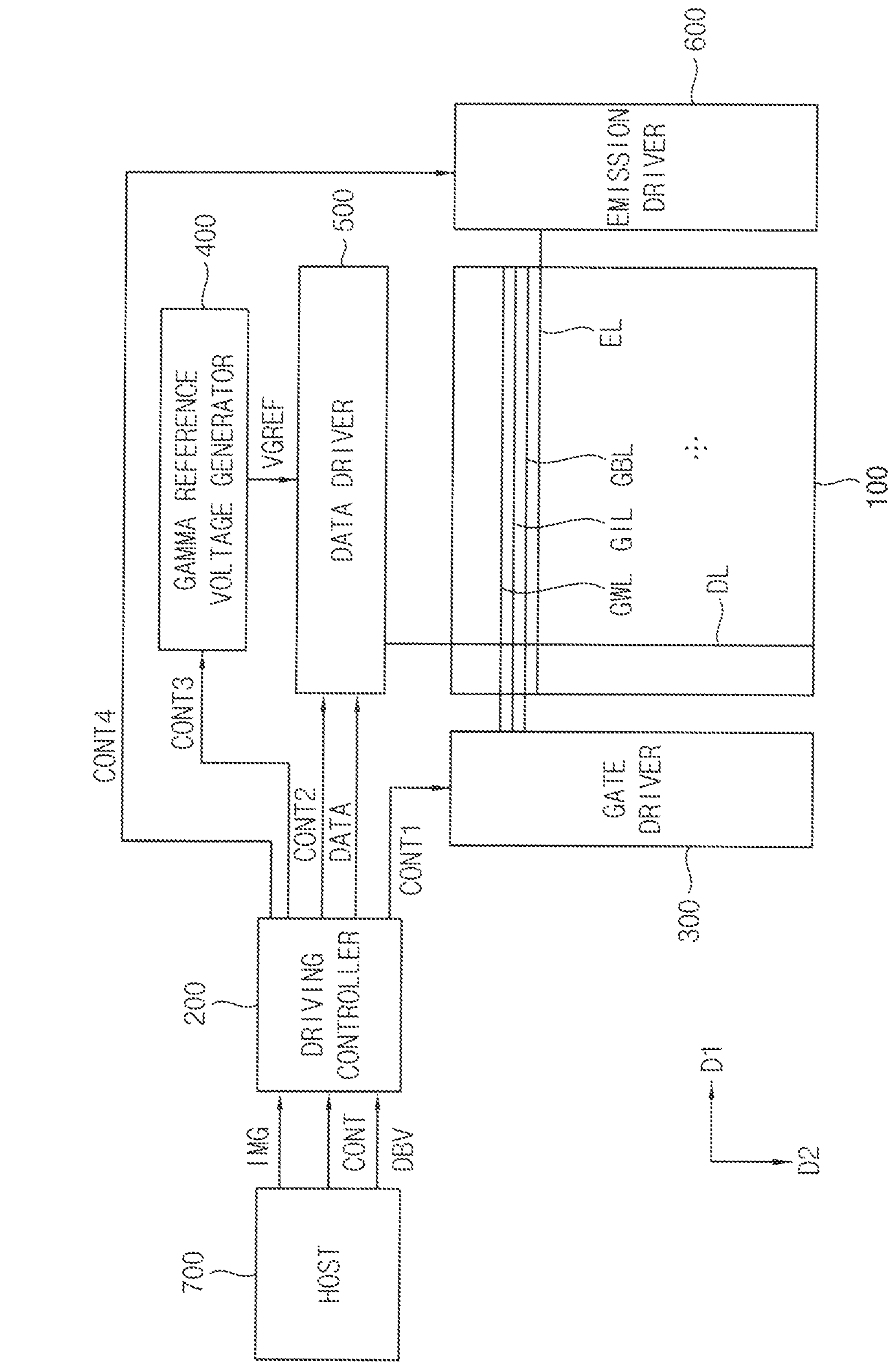
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GIL and GBL (also referred to as scan lines), a plurality of data lines DL, a plurality of emission lines EL and a plurality of pixels electrically connected to the gate lines GWL, GIL and GBL, the data lines DL and the emission lines EL. The gate lines GWL, GIL and GBL extend in a first direction D1, the data lines DL extend in a second direction D2 crossing the first direction D1 and the emission lines EL extend in the first direction D1.

The driving controller 200 receives input image data IMG and an input control signal CONT from a host 700. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals for driving the gate lines GWL, GIL and GBL in response to the first control signal CONT1 received from the driving controller 200. The gate driver 300 may sequentially output the gate signals to the gate lines GWL, GIL and GBL. For example, the gate driver 300 may be integrated on the display panel 100. For example, the gate driver 300 may be mounted on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment of the present inventive concept, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages (or data signals) to the data lines DL.

The emission driver 600 generates emission signals to drive the emission lines EL in response to the fourth control signal CONT4 received from the driving controller 200. The emission driver 600 may output the emission signals to the emission lines EL.

Figure 2:
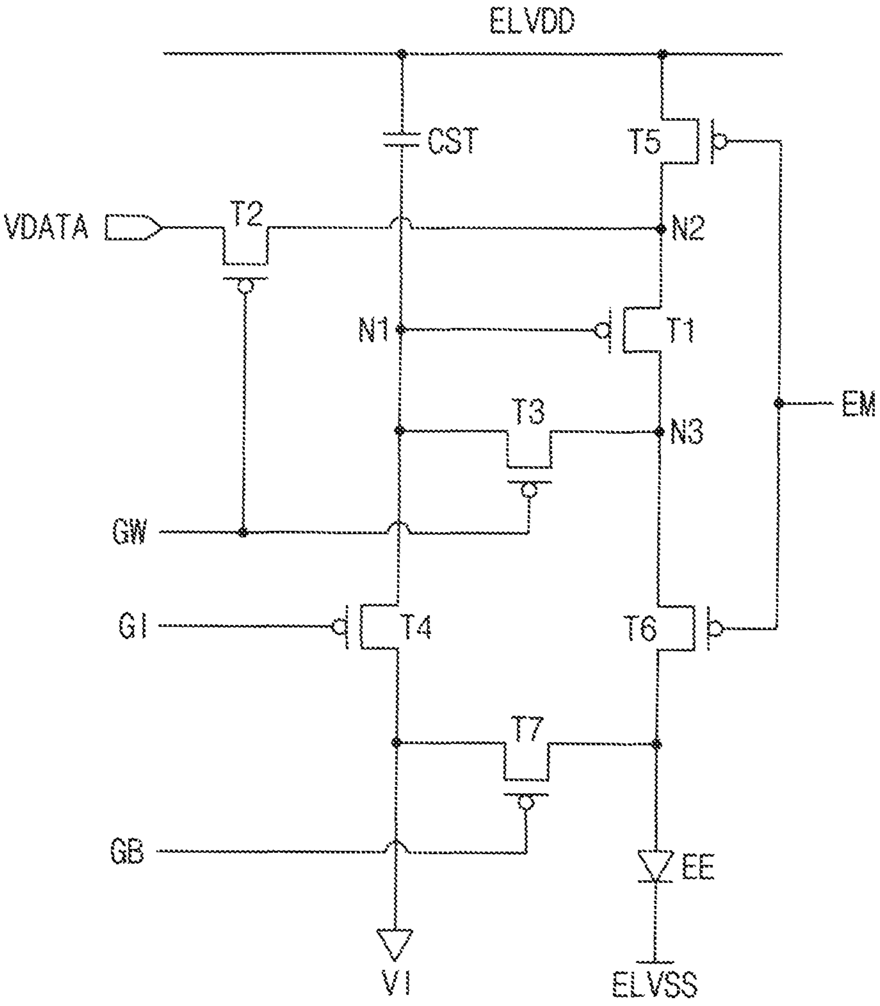
FIG. 2 is a circuit diagram illustrating an example of a pixel of a display panel of FIG. 1.
Figure 3:
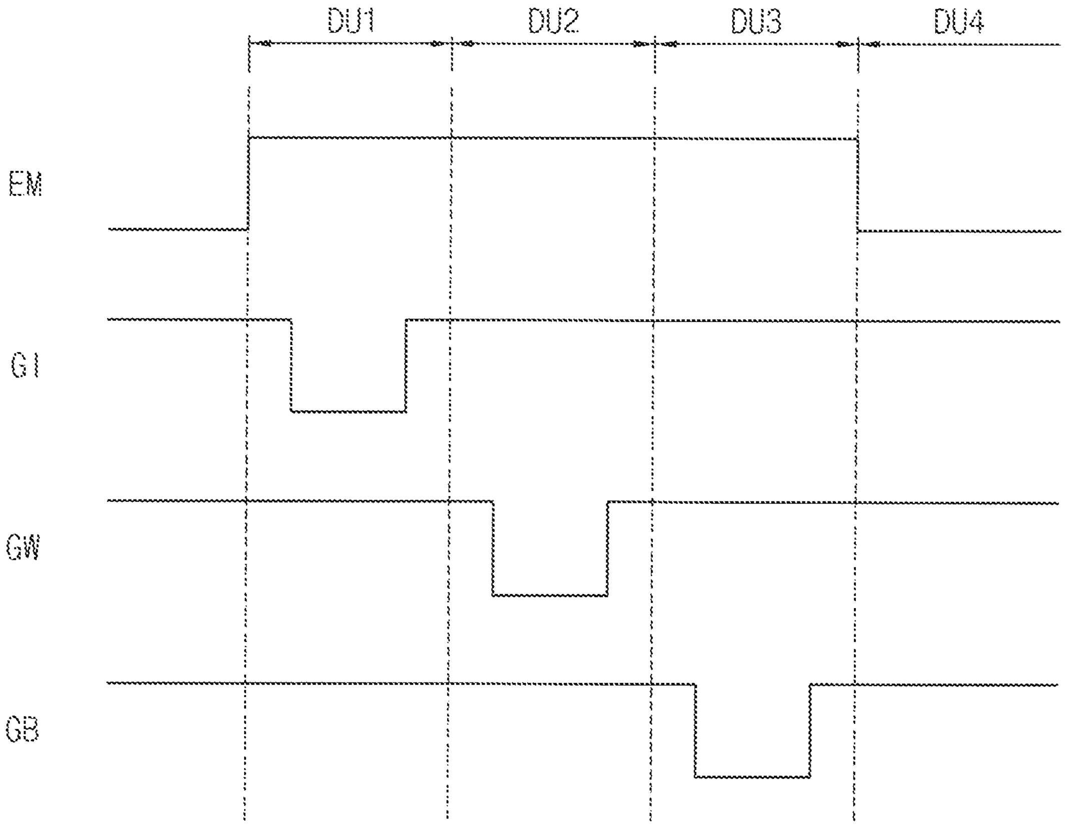
FIG. 3 is a timing diagram illustrating input signals applied to the pixel of FIG. 2.

FIG. 2 is a circuit diagram illustrating an example of a pixel of the display panel 100 of FIG. 1. FIG. 3 is a timing diagram illustrating input signals applied to the pixel of FIG. 2.

Referring to FIGS. 1 to 3, the display 100 includes the plurality of the pixels. Each pixel includes a light emitting element EE.

The pixels receive a data writing gate signal GW, a data initialization gate signal GI, a light emitting element initialization gate signal GB, the data voltage VDATA and the emission signal EM and the light emitting elements EE of the pixels emit light corresponding to the level of the data voltage VDATA to display an image.

At least one of the pixels may include first, second, third, fourth, fifth, sixth and seventh pixel switching elements T1, T2, T3, T4, T5, T6 and T7, a storage capacitor CST and the light emitting element EE.

The first pixel switching element T1 includes a control electrode connected to a first node N1, an input (or first) electrode connected to a second node N2 and an output (or second) electrode connected to a third node N3.

The second pixel switching element T2 includes a control electrode for receiving the data writing gate signal GW, an input (or first) electrode for receiving the data voltage VDATA and an output (or second) electrode connected to the second node N2.

The third pixel switching element T3 includes a control electrode for receiving the data writing gate signal GW, an input (or first) electrode connected to the first node N1 and an output (or second) electrode connected to the third node N3.

The fourth pixel switching element T4 includes a control electrode for receiving the data initialization gate signal GI, an input (or first) electrode for receiving an initialization voltage VI and an output (or second) electrode connected to the first node N1.

The fifth pixel switching element T5 includes a control electrode for receiving the emission signal EM, an input (or first) electrode for receiving a high power voltage ELVDD and an output (or second) electrode connected to the second node N2.

The sixth pixel switching element T6 includes a control electrode for receiving the emission signal EM, an input (or first) electrode connected to the third node N3 and an output (or second) electrode connected to an anode electrode of the light emitting element EE.

The seventh pixel switching element T7 includes a control electrode for receiving the light emitting element initialization gate signal GB, an input (or first) electrode for receiving the initialization voltage VI and an output (or second) electrode connected to the anode electrode of the light emitting element EE.

For example, the first to seventh pixel switching elements T1 to T7 may be P-type thin film transistors. The control electrodes of the first to seventh pixel switching elements T1 to T7 may be gate electrodes, the input electrodes of the first to seventh pixel switching elements T1 to T7 may be source electrodes and the output electrodes of the first to seventh pixel switching elements T1 to T7 may be drain electrodes.

The storage capacitor CST includes a first electrode for receiving the high power voltage ELVDD and a second electrode connected to the first node N1.

The light emitting element EE includes the anode electrode and a cathode electrode for receiving a low power voltage ELVSS.

In FIG. 3, during a first duration DU1, the first node N1 and the storage capacitor CST are initialized in response to the data initialization gate signal GI. For example, the data initialization gate signal GI may transition to a low level in the first duration DU1. During a second duration DU2, a threshold voltage |VTH| of the first pixel switching element T1 is compensated and the data voltage VDATA of which the threshold voltage |VTH| is compensated is written to the first node N1 in response to the data writing gate signal GW. For example, the data writing gate signal GW may transition to a low level in the second duration DU2. During a third duration DU3, the anode electrode of the light emitting element EE is initialized in response to the light emitting element initialization gate signal GB. For example, the light emitting element initialization gate signal GB may transition a low level in the third duration DU3. During a fourth duration DU4, the light emitting element EE emits the light in response to the emission signal EM so that the display panel 100 displays the image.

During the first duration DU1, the data initialization gate signal GI may have an active level. For example, the active level of the data initialization gate signal GI may be a low level. When the data initialization gate signal GI has the active level, the fourth pixel switching element T4 is turned on so that the initialization voltage VI may be applied to the first node N1. The data initialization gate signal GI of a present stage may be a scan signal of a previous stage.

During the second duration DU2, the data writing gate signal GW may have an active level. For example, the active level of the data writing gate signal GW may be a low level. When the data writing gate signal GW has the active level, the second pixel switching element T2 and the third pixel switching element T3 are turned on. In addition, the first pixel switching element T1 is turned on in response to the initialization voltage VI. The data writing gate signal GW of the present stage may be a scan signal of the present stage.

A voltage which is a subtraction of an absolute value |VTH| of the threshold voltage of the first pixel switching element T1 from the data voltage VDATA may be charged at the first node N1 along a path generated by the first to third pixel switching elements T1, T2 and T3.

During the third duration DU3, the light emitting element initialization gate signal GB may have an active level. For example, the active level of the light emitting element initialization gate signal GB may be a low level. When the light emitting element initialization gate signal GB has the active level, the seventh pixel switching element T7 is turned on so that the initialization voltage VI may be applied to the anode electrode of the light emitting element EE. The light emitting element initialization gate signal GB of the present stage may be a scan signal of a next stage.

During the fourth duration DU4, the emission signal EM may have an active level. The active level of the emission signal EM may be a low level. When the emission signal EM has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the light emitting element EE. An intensity of the driving current may be determined by the level of the data voltage VDATA. A luminance of the light emitting element EE is determined by the intensity of the driving current.

The threshold voltage |VTH| is compensated during the second duration DU2, so that the driving current may be determined regardless of the threshold voltage VTH of the first pixel switching element T1 when the light emitting element EE emits the light during the fourth duration DU4.

Figure 4:
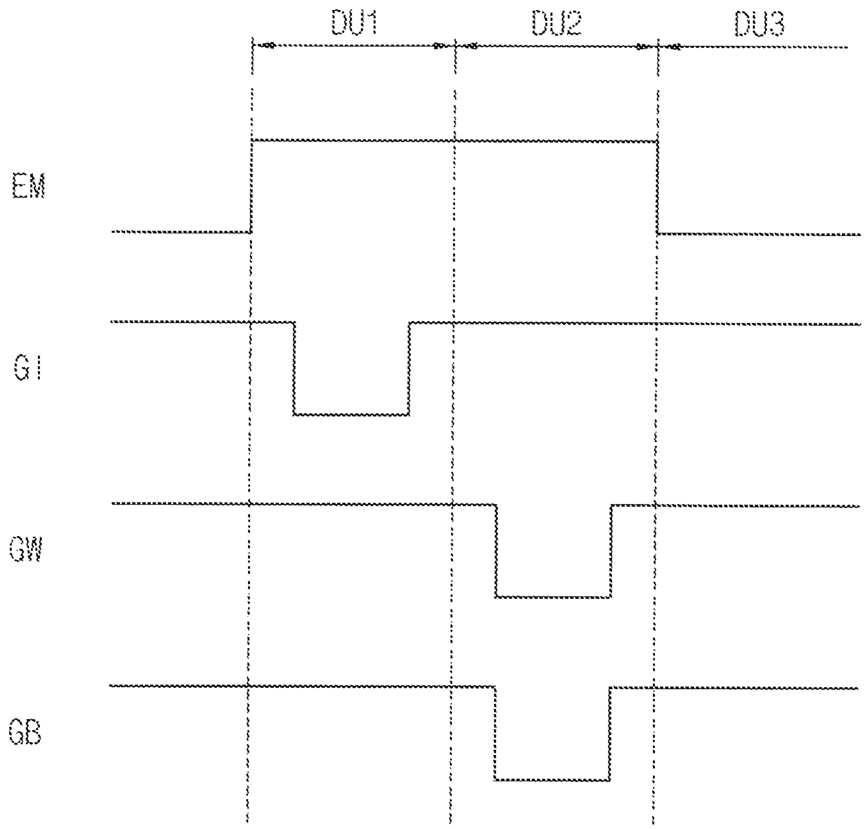
FIG. 4 is a timing diagram illustrating input signals applied to the pixel of FIG. 2.

FIG. 4 is a timing diagram illustrating input signals applied to the pixel of FIG. 2.

The input signals applied to the pixel of the display apparatus and the method of driving the display panel according to the present embodiment are substantially the same as the input signals applied to the pixel of the display apparatus and the method of driving the display panel of FIGS. 1 to 3 except that the active period of the light emitting element initialization gate signal GB is same as the active period of the data writing gate signal GW. Thus, the same reference numerals will be used to refer to the same or like parts as those described in the previous embodiment of FIGS. 1 to 3 and any repetitive explanation concerning the above elements may be omitted.

Referring to FIGS. 1, 2 and 4, during a first duration DU1, the first node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first node N1 in response to the data writing gate signal GW. In addition, during the second duration DU2, the anode electrode of the light emitting element EE is initialized in response to the light emitting element initialization gate signal GB. In the second duration DU2, the active period of the data writing gate signal GW and the light emitting element initialization gate signal GB overlap. During a third duration DU3, the light emitting element EE emits the light in response to the emission signal EM so that the display panel 100 displays the image.

In the present embodiment, the active period of the light emitting element initialization gate signal GB may be same as the active period of the data writing gate signal GW. For example, the control electrode of the seventh pixel switching element T7 may be connected to the control electrode of the second pixel switching element T2.

Figure 5:
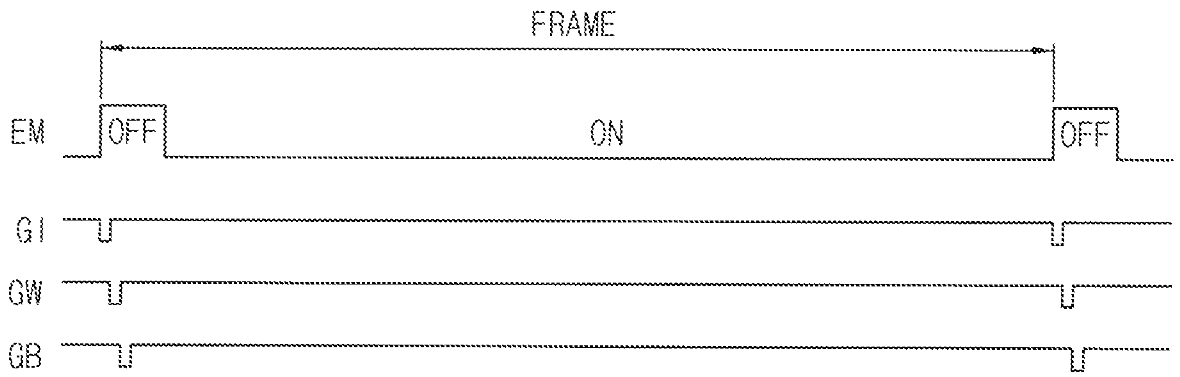
FIG. 5 is a timing diagram illustrating input signals applied to the pixel of FIG. 2 when the number of light emissions is one in a single frame and a display image represents a high luminance.
Figure 6:
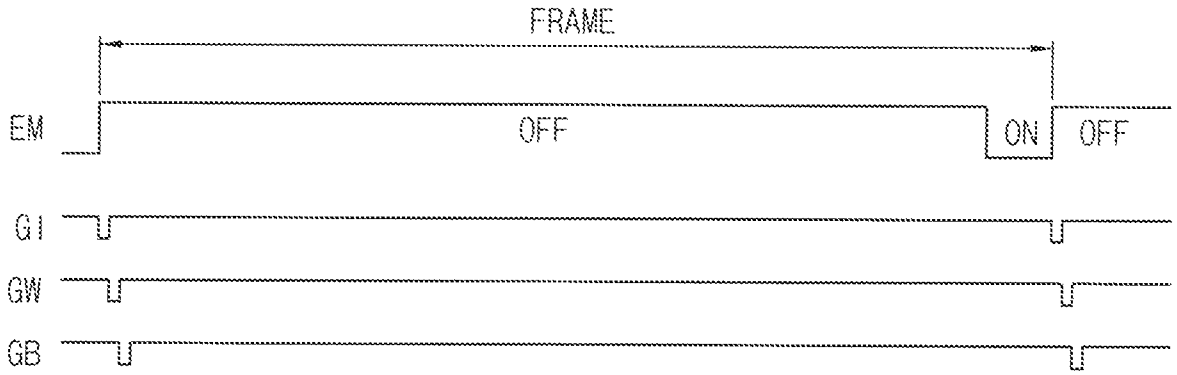
FIG. 6 is a timing diagram illustrating input signals applied to the pixel of FIG. 2 when the number of light emissions is one in the single frame and a display image represents a low luminance.

FIG. 5 is a timing diagram illustrating input signals applied to the pixel of FIG. 2 when the number of light emissions is one in a single frame FRAME and a display image represents a high luminance. FIG. 6 is a timing diagram illustrating input signals applied to the pixel of FIG. 2 when the number of light emissions is one in the single frame FRAME and a display image represents a low luminance.

Referring to FIGS. 1 to 6, the driving controller 200 may determine the number of light emissions in the single frame FRAME of the emission signal EM according to the luminance of the display image. In FIGS. 5 and 6, the number of light emissions in the single frame FRAME may be one. For convenience of explanation, the data writing gate signal GW, the data initialization gate signal GI and the light emitting element initialization gate signal GB may have the waveforms shown in FIG. 3. However, the present inventive concept may not be limited thereto. Alternatively, the data initialization gate signal GI and the light emitting element initialization gate signal GB may have the waveforms shown in FIG. 4. Alternatively, the data initialization gate signal GI and the light emitting element initialization gate signal GB may have waveforms different from the waveforms shown in FIGS. 3 and 4.

The display panel 100 may display an output grayscale value of the display image based on the data voltage VDATA and an active period ON of the emission signal EM. When the data voltage VDATA increases, the output grayscale value of the display image may increase. In addition, when the active period ON of the emission signal EM increases, the output grayscale value of the display image may increase.

The active period ON of the emission signal EM may be set to be longer than an inactive period OFF of the emission signal EM to represent a high luminance as shown in FIG. 5. In other words, a high luminance may be achieved due to the long active period ON of the emission signal EM. In contrast, the inactive period OFF of the emission signal EM may be set to be longer than the inactive period ON of the emission signal EM to represent a low luminance as shown in FIG. 6. In other words, a low luminance may be achieved due to the long inactive period OFF of the emission signal EM.

Figure 7:
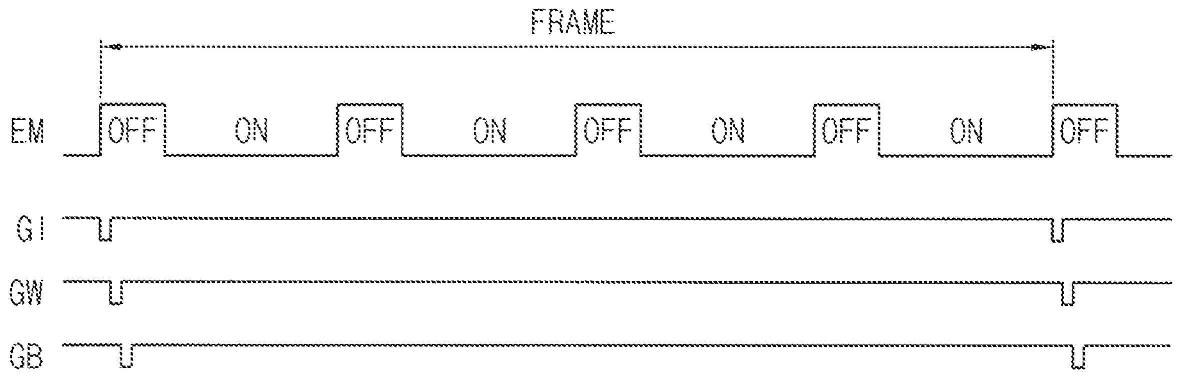
FIG. 7 is a timing diagram illustrating input signals applied to the pixel of FIG. 2 when the number of light emissions is four in the single frame and a display image represents a high luminance.
Figure 8:
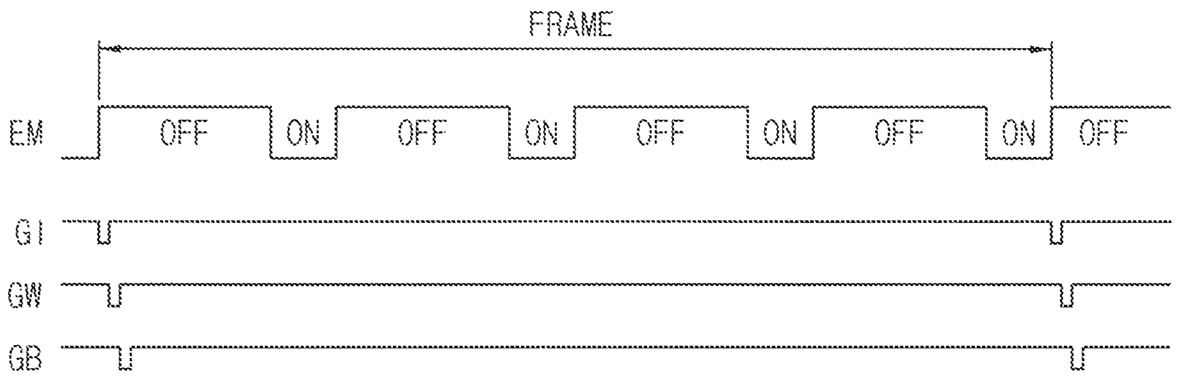
FIG. 8 is a timing diagram illustrating input signals applied to the pixel of FIG. 2 when the number of light emissions is four in the single frame and a display image represents a low luminance.

FIG. 7 is a timing diagram illustrating input signals applied to the pixel of FIG. 2 when the number of light emissions is four in the single frame FRAME and a display image represents a high luminance. FIG. 8 is a timing diagram illustrating input signals applied to the pixel of FIG. 2 when the number of light emissions is four in the single frame FRAME and a display image represents a low luminance. In each of FIGS. 5 to 8, the data initialization gate signal GI, the data writing gate signal GW and the light emitting element initialization gate signal GB may be sequentially active.

Referring to FIGS. 1 to 8, the driving controller 200 may determine the number of light emissions in the single frame FRAME of the emission signal EM according to the luminance of the display image. In FIGS. 7 and 8, the number of light emissions in the single frame FRAME may be four and in FIGS. 5 and 6 the number of light emissions in the single frame FRAME may be one.

The active period ON of the emission signal EM may be set to be longer than an inactive period OFF of the emission signal EM to represent a high luminance as shown in FIG. 7. In contrast, the inactive period OFF of the emission signal EM may be set to be longer than the active period ON of the emission signal EM to represent a low luminance as shown in FIG. 8.

Figure 9:
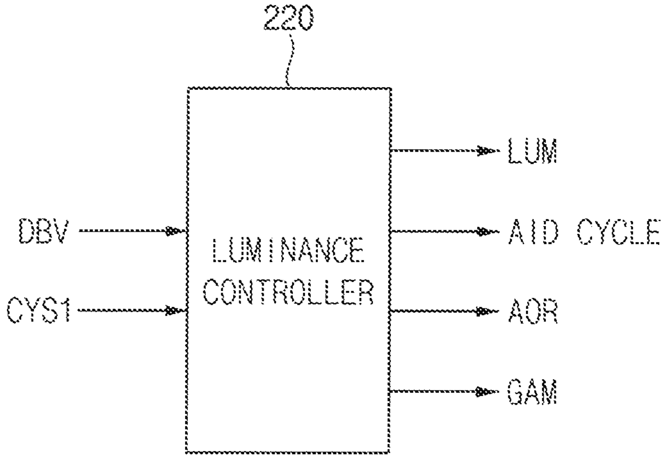
FIG. 9 is a block diagram illustrating an example of a luminance controller of a driving controller of FIG. 1.

FIG. 9 is a block diagram illustrating an example of a luminance controller 220 of the driving controller 200 of FIG. 1.

Referring to FIGS. 1 to 9, the driving controller 200 may determine an AID CYCLE (e.g., a light emission cycle) representing the number of light emissions in the single frame FRAME of the emission signal EM. Herein, AID may be an abbreviation for AMOLED (active matrix organic light emitting diode) Impulsive Driving.

The driving controller 200 may determine a luminance LUM according to a user luminance setting DBV and a grayscale value of the input image data IMG, determine an AID CYCLE corresponding to a luminance range, and determine an AOR (an off ratio) which is a ratio of turned-off gate lines among total gate lines. In addition, the driving controller 200 may determine a gamma value GAM corresponding to the grayscale value. Herein, AOR may be an abbreviation for an AMOLED (active matrix organic light emitting diode) Off Ratio.

The luminance LUM of the display image may be determined according to the user luminance setting DBV set by a user. For example, the user luminance setting DBV may be inputted to the driving controller 200 from the host 700. The luminance LUM of the display image may be varied in real time according to the user luminance setting DBV.

The luminance controller 220 of the driving controller 200 may receive the user luminance setting DBV and a first light emission number setting value CYS1 and may output the luminance LUM, the AID CYCLE, the AOR and the gamma value GAM.

The first light emission number setting value CYS1 may include setting values representing relationships between the luminance range and the AID CYCLE. The luminance controller 220 may determine a first AID CYCLE corresponding to a first luminance range (e.g., a high luminance range), a second AID CYCLE corresponding to a second luminance range (e.g., a middle luminance range) having luminances less than luminances of the first luminance range, and a third AID CYCLE corresponding to a third luminance range (e.g., a low luminance range) having luminances less than the luminances of the second luminance range and the first luminance range. For example, the second AID CYCLE may be different from the first AID CYCLE. For example, the third AID CYCLE may be different from the second AID CYCLE. In addition, the first AID CYCLE may be different from the third AID CYCLE.

In an embodiment of the inventive concept, there is provided a display apparatus including: a display panel 100 including an emission line EL and a pixel electrically connected to the emission line EL; an emission driver 600 configured to output an emission signal to the emission line EL; and a driving controller 200 configured to determine a light emission cycle AID CYCLE, wherein the light emission cycle is a number of light emissions in a single frame of the emission signal, wherein the driving controller 200 is configured to determine a luminance LUM according to a user luminance setting DBV and a grayscale value of input image data IMG, to determine the light emission cycle AID CYCLE corresponding to a range of the luminance and to determine an off ratio AOR according to the luminance, wherein the off ratio AOR is a ratio of turned-off gate lines to a total number of the gate lines GWL, GIL and GBL.

Figure 10:
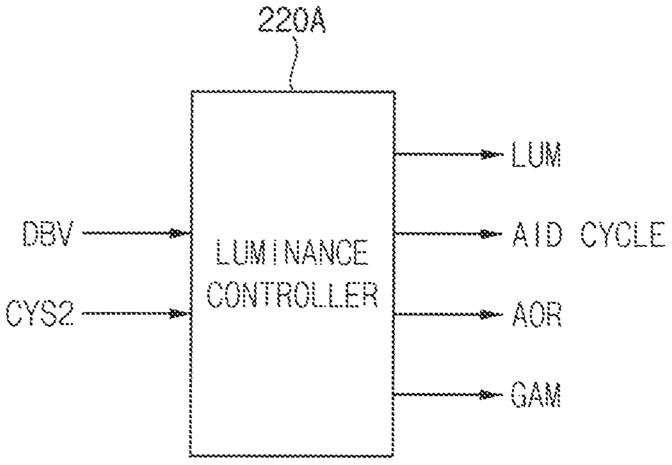
FIG. 10 is a block diagram illustrating another example of a luminance controller of the driving controller of FIG. 1.

FIG. 10 is a block diagram illustrating an example of a luminance controller 220A of the driving controller 200 of FIG. 1.

The luminance controller of the display apparatus and the method of driving the display panel according to the present embodiment are substantially the same as the luminance controller of the display apparatus and the method of driving the display panel of the previous embodiment explained referring to FIG. 9 except for determining the AID CYCLE corresponding to the AOR instead of determining the AID CYCLE corresponding to the luminance range. Thus, the same reference numerals will be used to refer to the same or like parts as those described in the previous embodiment of FIGS. 1 to 9 and any repetitive explanation concerning the above elements may be omitted.

Referring to FIGS. 1 to 8 and 10, the driving controller 200 may determine AID CYCLE representing the number of light emissions in the single frame FRAME of the emission signal EM.

The driving controller 200 may determine a luminance LUM according to a user luminance setting DBV and a grayscale value of the input image data IMG, determine the AOR which is a ratio of turned-off gate lines among total gate lines and determine the AID CYCLE corresponding to a range of the AOR. In addition, the driving controller 200 may determine a gamma value GAM corresponding to the grayscale value.

The luminance controller 220A of the driving controller 200 may receive the user luminance setting DBV and a second light emission number setting value CYS2 and may output the luminance LUM, the AID CYCLE, the AOR and the gamma value GAM.

The second light emission number setting value CYS2 may include setting values representing relationships between the range of the AOR and the AID CYCLE. The luminance controller 220A may determine a first AID CYCLE corresponding to a first range (e.g., a high luminance range) of the AOR, a second AID CYCLE corresponding to a second range (e.g., a middle luminance range) of the AOR having AORs greater than AORs of the first range of the AOR, and a third AID CYCLE corresponding to a third range (e.g., a low luminance range) of the AOR having AORs greater than the AORs of the second range of the AOR. For example, the second AID CYCLE may be different from the first AID CYCLE. For example, the third AID CYCLE may be different from the second AID CYCLE. In addition, the third AID CYCLE may be different from the first AID CYCLE.

A high AOR may mean a high ratio of the turned-off gate lines among the total gate lines. Thus, when the AOR is high, the luminance of the display image may be low.

Figure 11:
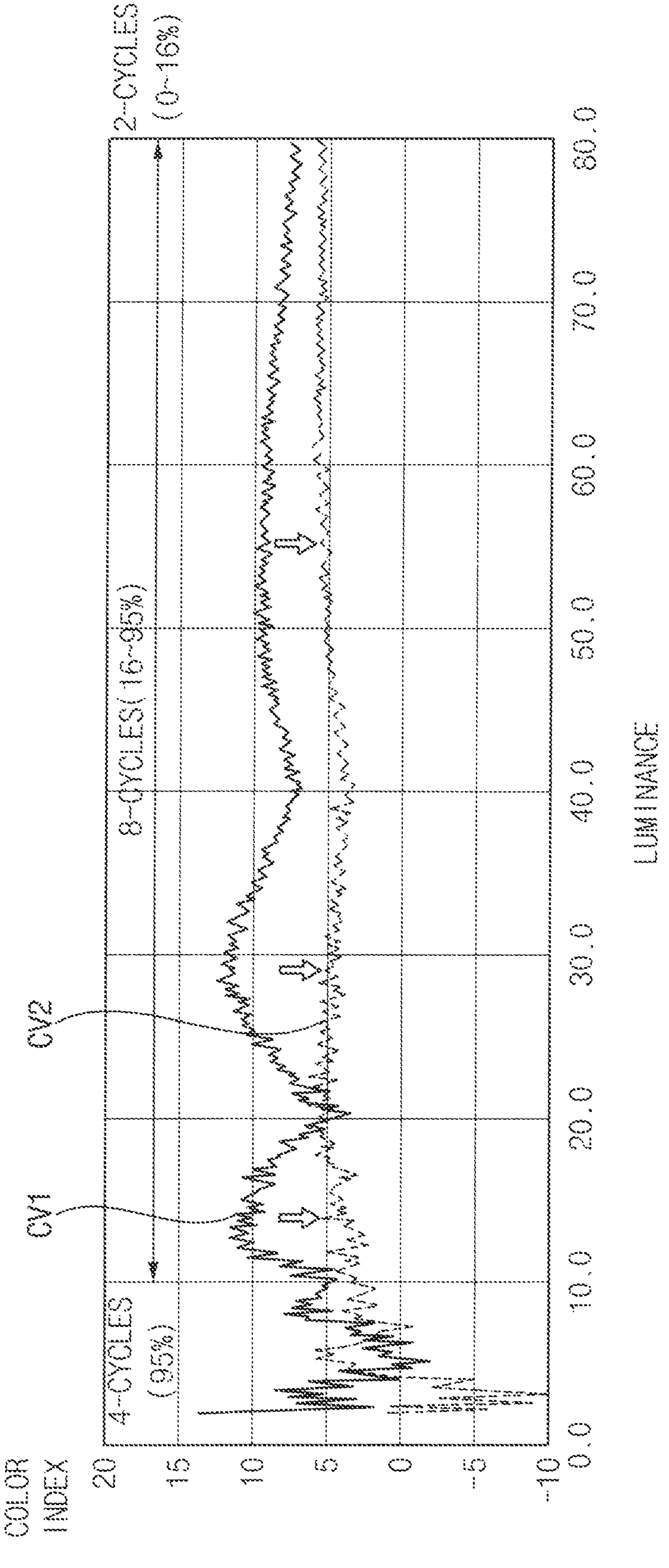
FIG. 11 is a graph illustrating a number of light emissions in a single frame and a color index according to luminance ranges.

FIG. 11 is a graph illustrating the number of light emissions in the single frame and a color index according to the luminance ranges. In FIG. 11, a horizontal axis may indicate a luminance and a unit of the luminance may be nit. In FIG. 11, a vertical axis may indicate a color index. For example, the color index may be MPCD (minimum perceptible color difference). When the color index moves away from zero in a positive direction, it may mean that the display image becomes greenish. In contrast, when the color index moves away from zero in a negative direction, it may mean that the display image becomes reddish.

Referring to FIGS. 1 to 11, for example, the second AID CYCLE corresponding to the second luminance range (or the second range of the AOR, the middle luminance range) may be greater than the first AID CYCLE corresponding to the first luminance range (or the first range of the AOR, the high luminance range). In the high luminance range, the luminance of the display image may be adjusted using the data voltage while the number of light emissions (AID CYCLE) is fixed to once or twice and the AOR is fixed to a minimum value. In contrast, in the middle luminance range or the low luminance range, the luminance may be adjusted while gradually increasing the AOR.

When the number of light emissions (AID CYCLE) is set to be little in the middle luminance range or the low luminance range, the flicker may occur or the color may be shifted due to an off leakage of the light emitting element EE. Thus, the second AID CYCLE may be set to be greater than the first AID CYCLE to prevent the flicker and the color shift.

The third AID CYCLE corresponding to the third luminance range (or the third range of the AOR, the low luminance range) may be less than the second AID CYCLE corresponding to the second luminance range (or the second range of the AOR, the middle luminance range). In the third luminance range, the luminance is extremely low so that a deterioration of the display quality such as the color shift may not be recognized by a user. Thus, the third AID CYCLE may be set to be less than the second AID CYCLE to reduce the power consumption in the third luminance range.

For example, the third AID CYCLE corresponding to the third luminance range (or the third range of the AOR, the low luminance range) may be greater than the first AID CYCLE corresponding to the first luminance range (or the first range of the AOR, the high luminance range).

For example, as shown in FIG. 11, the first AID CYCLE may be two, the second AID CYCLE may be three and the third AID CYCLE may be four.

In the first luminance range having a luminance equal to or greater than 80 nits, the first AID CYCLE is set to two (2-CYCLES) and the AOR may have a value between 0% and 16%. In the second luminance range having a luminance equal to or greater than 10 nits and less than 80 nits, the second AID CYCLE is set to eight (8-CYCLES) and a second curve CV2 connecting the color indexes is more uniformly formed compared to a first curve CV1 so that the color shift at each luminance level may be compensated. Herein, the first curve CV1 may correspond to a case in which the AID CYCLE is fixed to two in all of the luminance ranges. Herein, when the value of the color index is greater, it may mean that the image becomes greenish and when the value of the color index is little, it may mean that the image becomes reddish.

As shown in the first curve CV1, the compensation of the color index is performed by capturing an image at specific luminance points such as 40 nits, 20 nits and 10 nits so that the color index for the specific luminance points such as 40 nits, 20 nits and 10 nits may have desired values. In contrast, the color index may rise significantly compared to the desired values for the luminance region between 40 nits and 20 nits and between 20 nits and 10 nits so that the color index may not have a uniform value.

As shown in the second curve CV2 of the present embodiment, the color index may not have a uniform value even in a luminance region between 40 nits and 20 nits and between 20 nits and 10 nits. As a result, when the AID CYCLE is properly set for each luminance range, the color shift of the display image may be compensated.

In the third luminance range having a luminance less than 10 nits, the third AID CYCLE may be set to four (4-CYCLES). In the third luminance range, the image quality issue such as the color shift may not be easily recognized by the user so that the number of light emissions may be reduced from eight to four to reduce the power consumption.

Figure 12A:
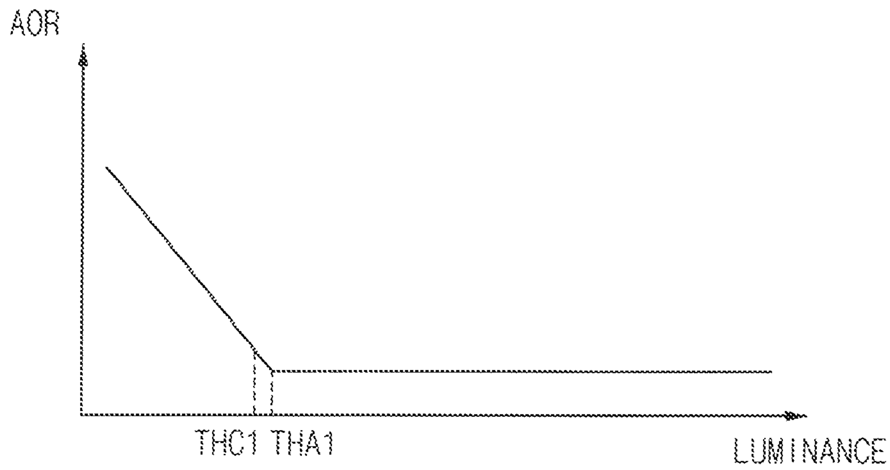
FIG. 12A is a graph illustrating a case in which a luminance point at which an on off ratio (AOR) is changed and a luminance point at which Active Matrix Organic Light Emitting Diode (AMOLED) Impulsive Driving (AID CYCLE) is changed do not match.
Figure 12B:
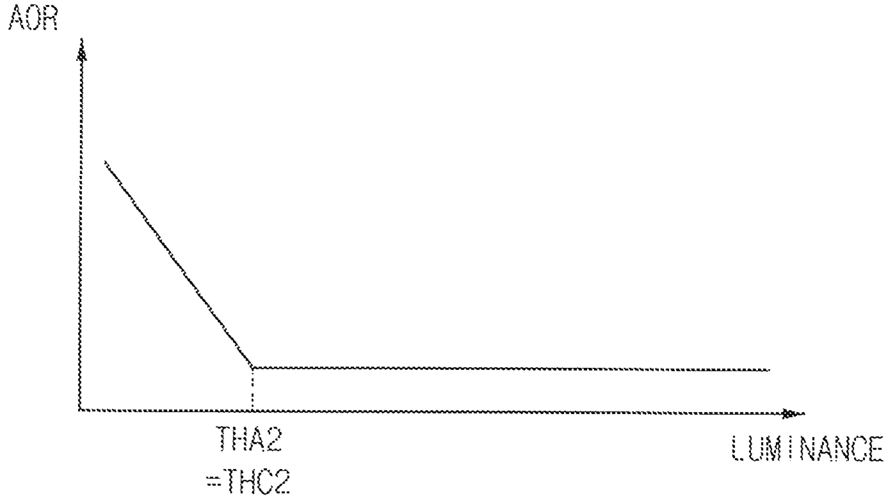
FIG. 12B is a graph illustrating a case in which the luminance point at which AOR is changed and the luminance point at which an AID CYCLE is changed match.

FIG. 12A is a graph illustrating a case in which a luminance point at which AOR is changed and a luminance point at which AID CYCLE is changed do not match. FIG. 12B is a graph illustrating a case in which the luminance point at which AOR is changed and the luminance point at which AID CYCLE is changed match.

As shown in FIG. 12A, in the high luminance range, while the AOR has a constant value, the luminance of the display image may be changed by adjusting the data voltage. In contrast, in the low luminance range, the luminance of the display image may be decreased while gradually increasing the AOR. Herein, when the luminance point THA1 at which the AOR is changed and the luminance point THC1 at which the AID CYCLE is changed do not match, the color shift may temporally occur.

As shown in FIG. 12B, the driving controller 200 may match the luminance point THA2 at which the AOR is changed and the luminance point THC2 at which the AID CYCLE is changed such that the luminance point THA2 at which the AOR is changed and the luminance point THC2 at which the AID CYCLE is changed are substantially the same as each other. Thus, color shift due to a mismatch between the luminance point THA1 at which the AOR is changed and the luminance point THC1 at which the AID CYCLE is changed may be prevented.

According to the present embodiment, the number of light emissions AID CYCLE of the emission signal EM may be properly varied according to the luminance range of the display image or the ratio AOR of the turned-off gate lines among the total gate lines. Thus, the color shift generated when the luminance is changed may be effectively controlled and the electromagnetic interference (EMI) characteristics and the power consumption may be optimized.

Figures 13, 14:
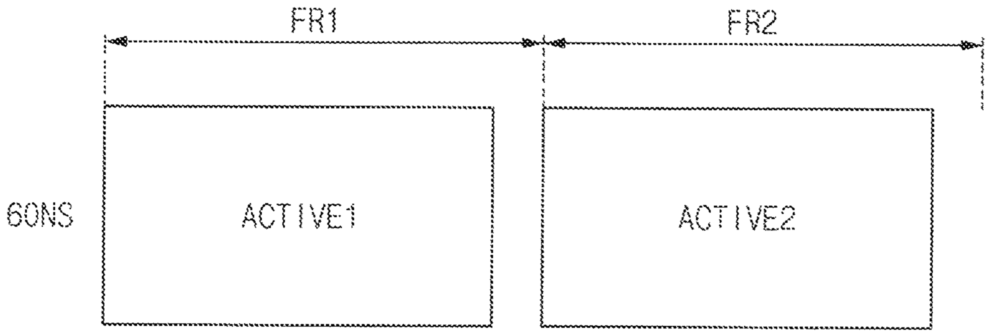
FIG. 13 is a table illustrating AID CYCLEs determined by the driving controller of FIG. 1 according to a driving mode, a driving frequency and a luminance.
FIG. 14 is a timing diagram illustrating frames in a first mode and in a first frequency.
Figures 15, 16:
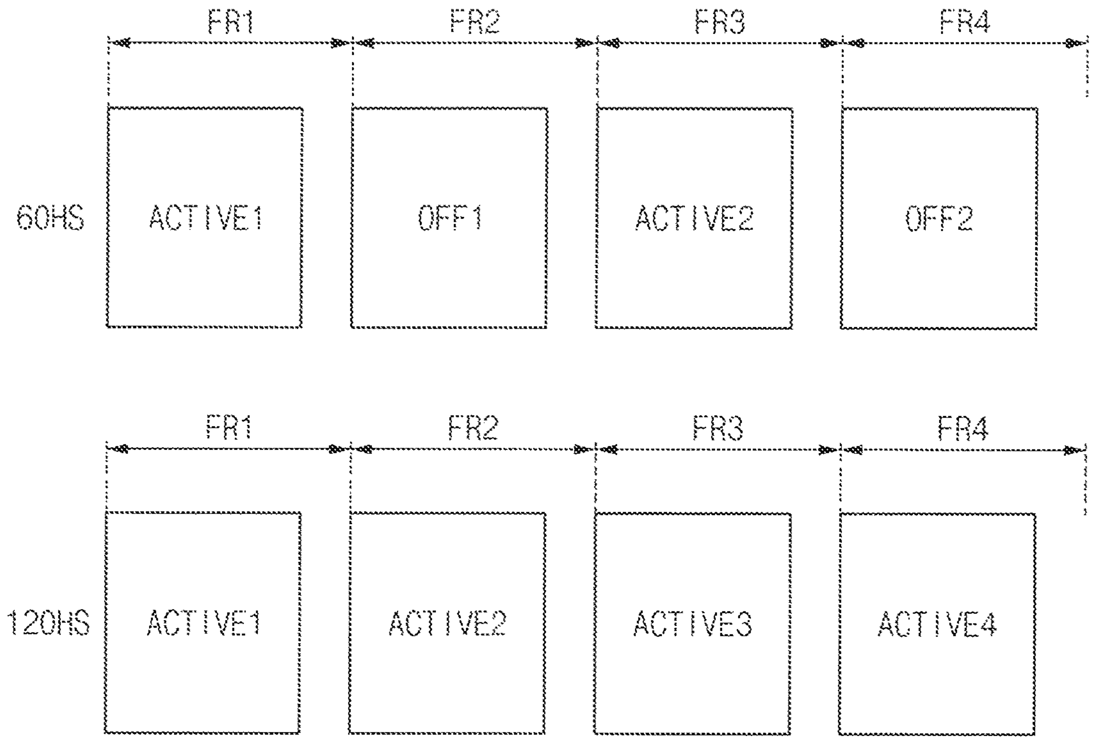
FIG. 15 is a timing diagram illustrating frames in the first frequency and a second frequency of a second mode.
FIG. 16 is a table illustrating AID CYCLEs determined by the driving controller of FIG. 1 according to the driving mode, the driving frequency and the luminance.

FIG. 13 is a table illustrating AID CYCLEs determined by the driving controller of FIG. 1 according to a driving mode, a driving frequency and a luminance. FIG. 14 is a timing diagram illustrating frames in a first mode and in a first frequency. FIG. 15 is a timing diagram illustrating frames in the first frequency and a second frequency of a second mode.

Referring to FIGS. 1 to 13, the driving controller 200 may determine the AID CYCLE according to the driving mode, the driving frequency and the luminance and may determine the AOR which is the ratio of the turned-off gate lines among the total gate lines.

The driving controller 200 may determine a first AID CYCLE corresponding to a first mode NS, a first frequency 60 NS and a high luminance range, a second AID CYCLE corresponding to the first mode NS, the first frequency 60 NS and a middle luminance range and a third AID CYCLE corresponding to the first mode NS, the first frequency 60 NS and a low luminance range.

The driving controller 200 may determine a fourth AID CYCLE corresponding to a second mode HS, the first frequency 60 HS and the high luminance range, a fifth AID CYCLE corresponding to the second mode HS, the first frequency 60 HS and the middle luminance range and a sixth AID CYCLE corresponding to the second mode HS, the first frequency 60 HS and the low luminance range.

The driving controller 200 may determine a seventh AID CYCLE corresponding to the second mode HS, a second frequency 120 HS greater than the first frequency 60 HS and the high luminance range, an eighth AID CYCLE corresponding to the second mode HS, the second frequency 120 HS and the middle luminance range and a ninth AID CYCLE corresponding to the second mode HS, the second frequency 120 HS and the low luminance range.

Herein, the first mode NS may be a normal speed mode and the second mode HS may be a high speed mode. In the first mode NS, the display panel 100 may be driven in a fixed driving frequency (e.g., the first frequency). In the second mode HS, the display panel 100 may be driven in varied driving frequencies which are the first frequency and the second frequency greater than the first frequency. For example, the first frequency may be 60 Hz and the second frequency may be 120 Hz. However, the present inventive concept may be not limited thereto.

As shown in FIG. 14, a first active frame FR1 (ACTIVE1) having a first length and a second active frame FR2 (ACTIVE2) having the first length may be sequentially and continuously disposed in the first mode NS and in the first frequency 60 NS.

As shown in FIG. 15, a first active frame FR1 (ACTIVE1) having a second length less than the first length and a first off frame FR2 (OFF1) having the second length, a second active frame FR3 (ACTIVE2) having the second length and a second off frame FR4 (OFF2) having the second length may be sequentially and continuously disposed in the second mode HS and in the first frequency 60 HS. The length of the active frame in the second mode HS and in the first frequency 60 HS may be a half of the length of the active frame in the first mode NS and in the first frequency 60 NS.

A first active frame FR1 (ACTIVE1) having the second length, a second active frame FR2 (ACTIVE2) having the second length, a third active frame FR3 (ACTIVE3) having the second length and a fourth active frame FR4 (ACTIVE4) having the second length may be sequentially and continuously disposed in the second mode 1S and in the second frequency 120 HS. The length of the active frame in the second mode HS and in the second frequency 120 HS may be a half of the length of the active frame in the first mode NS and in the first frequency 60 NS. The length of the active frame in the second mode HS and in the second frequency 120 HS may be substantially the same as the length of the active frame in the second mode HS and in the first frequency 60 HS.

The second frequency 120 HS in the second mode HS is twice the first frequency 60 HS in the second mode HS so that the AID CYCLE (e.g., the seventh, eighth and ninth AID CYCLEs) in the second mode HS at the second frequency 120 HS may be half of the AID CYCLE (e.g., the fourth, fifth and sixth AID CYCLEs) in the second mode HS at the first frequency 60 HS.

In FIG. 13, the seventh AID CYCLE may be same as the fourth AID CYCLE, the eighth AID CYCLE may be same as the fifth AID CYCLE and the ninth AID CYCLE may be same as the sixth AID CYCLE. In addition, the seventh AID CYCLE may be same as the first AID CYCLE, the eighth AID CYCLE may be same as the second AID CYCLE and the ninth AID CYCLE may be same as the third AID CYCLE.

For example, the first AID CYCLE is four, the second AID CYCLE is four, the third AID CYCLE is four, the fourth AID CYCLE is four, the fifth AID CYCLE is four, the sixth AID CYCLE, is four, the seventh AID CYCLE is four, the eighth AID CYCLE is four and the ninth AID CYCLE is four.

In the present embodiment, the AID CYCLE may be properly adjusted without being limited by the driving mode and the driving frequency conditions so that the color shift may be prevented and the display quality may be enhanced.

FIG. 16 is a table illustrating AID CYCLEs determined by the driving controller 200 of FIG. 1 according to the driving mode, the driving frequency and the luminance.

In FIG. 16, the seventh AID CYCLE (8-CYCLES) may be greater than the fourth AID CYCLE (2-CYCLES) and the eighth AID CYCLE may be greater than the fifth AID CYCLE (4-CYCLES). The number of light emissions (AID CYCLE) in the high frequency 120 HS of the second mode HS may be set to be greater than the number of light emissions (AID CYCLE) in the low frequency 60 HS of the second mode HS.

In an alternative embodiment, the eighth AID CYCLE may be greater than the seventh AID CYCLE. For example, the eighth AID CYCLE may be greater than 8-CYCLES. The number of light emissions (AID CYCLE) in the middle luminance range may be greater than the number of light emissions (AID CYCLE) in the high luminance range so that the color shift may be prevented in the middle luminance range.

FIG. 17 is a table illustrating AID CYCLEs determined by the driving controller 200 of FIG. 1 according to the driving mode, the driving frequency and the luminance.

The frequency in the 120 HS mode is twice the frequency in the 60 HS mode so that the AID CYCLE (e.g., the seventh, eighth and ninth AID CYCLEs) in the 120 HS mode may be half of the AID CYCLE (e.g., the fourth, fifth and sixth AID CYCLEs) in the 60 HS mode.

In FIG. 17, the seventh AID CYCLE may be same as the fourth AID CYCLE, the eighth AID CYCLE may be same as the fifth AID CYCLE and the ninth AID CYCLE may be same as the sixth AID CYCLE. In addition, the seventh AID CYCLE may be same as the first AID CYCLE, the eighth AID CYCLE may be same as the second AID CYCLE and the ninth AID CYCLE may be same as the third AID CYCLE.

An AOR corresponding to a first AID CYCLE is a first AOR and an AOFF corresponding to the first AID CYCLE is a first AOFF, an AOR corresponding to a second AID CYCLE is a second AOR and an AOFF corresponding to the second AID CYCLE is a second AOFF, an AOR corresponding to a third AID CYCLE is a third AOR and an AOFF corresponding to the third AID CYCLE is a third AOFF, an AOR corresponding to a fourth AID CYCLE is a fourth AOR and an AOFF corresponding to the fourth AID CYCLE is a fourth AOFF, an AOR corresponding to a fifth AID CYCLE is a fifth AOR and an AOFF corresponding to the fifth AID CYCLE is a fifth AOFF, an AOR corresponding to a sixth AID CYCLE is a sixth AOR and an AOFF corresponding to the sixth AID CYCLE is a sixth AOFF, an AOR corresponding to a seventh AID CYCLE is a seventh AOR and an AOFF corresponding to the seventh AID CYCLE is a seventh AOFF, an AOR corresponding to an eighth AID CYCLE is an eighth AOR and an AOFF corresponding to the eighth AID CYCLE is an eighth AOFF and an AOR corresponding to a ninth AID CYCLE is a ninth AOR and an AOFF corresponding to the ninth AID CYCLE is a ninth AOFF.

The AOFF may mean the AOR in a single light emission period. Thus, multiplication of the AOFF and the AID CYCLE may be the AOR. As shown in FIGS. 14 and 15, the active frames are sequentially disposed in the 60 NS mode and the 120 HS mode. However, one active frame and one off frame are alternately disposed in the 60 HS mode so that multiplication of the AOFF and (AID CYCLE/2) may be the AOR in the 60 HS mode.

In FIG. 17, the first AID CYCLE is four, the second AID CYCLE is four, the third AID CYCLE is four, the fourth AID CYCLE is four, the fifth AID CYCLE is four, the sixth AID CYCLE is four, the seventh AID CYCLE is four, the eighth AID CYCLE is four and the ninth AID CYCLE is four.

The first AOR is 16%, the second AOR is 16~96%, the third AOR is 96%, the fourth AOR is 8%, the fifth AOR is 8~48%, the sixth AOR is 48%, the seventh AOR is 16%, the eighth AOR is 16-%% and the ninth AOR is 96%.

The first AOFF is 4%, the second AOFF is 4~24%, the third AOFF is 24%, the fourth AOFF is 4%, the fifth AOFF is 4~24%, the sixth AOFF is 24%, the seventh AOFF is 4%, the eighth AOFF is 4~24% and the ninth AOFF is 24%.

In the present embodiment, the first to third AOFFs are substantially the same as the fourth to sixth AOFFs. When the first to third AOFFs are substantially the same as the fourth to sixth AOFFs, the AOFF does not change even if the user changes the mode from the NS mode to the HS mode. Thus, when the user changes the mode from the NS mode to the HS mode, a seamless mode conversion in which the flicker is not recognized to the user is possible.

In the present embodiment, the fourth to sixth AOFFs are substantially the same as the seventh to ninth AOFFs. When the fourth to sixth AOFFs are substantially the same as the seventh to ninth AOFFs, the AOFF does not change even if the driving frequency is changed from a first frequency (e.g. 60 Hz) to a second frequency (e.g. 120 Hz) in the HS mode. Thus, even if the driving frequency is frequently changed in the HS mode, a seamless frequency conversion in which the flicker is not recognized to the user is possible.

FIG. 18 is a table illustrating AID CYCLEs determined by the driving controller 200 of FIG. 1 according to the driving mode, the driving frequency and the luminance.

In FIG. 18, the seventh AID CYCLE (2-CYCLES) may be less than the fourth AID CYCLE (4-CYCLES), the eighth AID CYCLE (4-CYCLES) may be less than the fifth AID CYCLE (8-CYCLES) and the ninth AID CYCLE (2-CYCLES) may be less than the sixth AID CYCLE (4-CYCLES).

For example, the eighth AID CYCLE (4-CYCLES) may be greater than the seventh AID CYCLE (2-CYCLES). The number of light emissions (AID CYCLE) in the middle luminance range may be greater than the number of light emissions (AID CYCLE) in the high luminance range so that the color shift may be prevented in the middle luminance range.

In FIG. 18, the first AID CYCLE is four, the second AID CYCLE is four, the third AID CYCLE is four, the fourth AID CYCLE is four, the fifth AID CYCLE is eight, the sixth AID CYCLE is four, the seventh AID CYCLE is two, the eighth AID CYCLE is four and the ninth AID CYCLE is two.

The first AOR is 16%, the second AOR is 16~96%, the third AOR is 96%, the fourth AOR is 16%, the fifth AOR is 16~96%, the sixth AOR is 96%, the seventh AOR is 16%, the eighth AOR is 16~96% and the ninth AOR is 96%.

The first AOFF is 4%, the second AOFF is 4~24%, the third AOFF is 24%, the fourth AOFF is 8%, the fifth AOFF is 4~24%, the sixth AOFF is 48%, the seventh AOFF is 8%, the eighth AOFF is 4~24% and the ninth AOFF is 48%.

In the present embodiment, the fourth to sixth AOFFs are substantially the same as the seventh to ninth AOFFs. When the fourth to sixth AOFFs are substantially the same as the seventh to ninth AOFFs, the AOFF does not change even if the driving frequency is changed from a first frequency (e.g. 60 Hz) to a second frequency (e.g. 120 Hz) in the HS mode. Thus, even if the driving frequency is frequently changed in the HS mode, a seamless frequency conversion in which the flicker is not recognized to the user is possible.

FIG. 19 is a table illustrating AID CYCLEs determined by the driving controller 200 of FIG. 1 according to the driving mode, the driving frequency and the luminance.

In FIG. 19, the seventh AID CYCLE (2-CYCLES) may be same as the first AID CYCLE (2-CYCLES), the eighth AID CYCLE (2-CYCLES) may be same as the second AID CYCLE (2-CYCLES) and the ninth AID CYCLE (2-CYCLES) may be same as the third AID CYCLE (2-CYCLES). In contrast, the seventh AID CYCLE (2-CYCLES) may be different from the fourth AID CYCLE (4-CYCLES), the eighth AID CYCLE (2-CYCLES) may be different from the fifth AID CYCLE (4-CYCLES) and the ninth AID CYCLE (2-CYCLES) may be different from the sixth AID CYCLE (4-CYCLES).

In FIG. 19, the first AID CYCLE is two, the second AID CYCLE is two, the third AID CYCLE is two, the fourth AID CYCLE is four, the fifth AID CYCLE is four, the sixth AID CYCLE is four, the seventh AID CYCLE is two, the eighth AID CYCLE is two and the ninth AID CYCLE is two.

The first AOR is 16%, the second AOR is 16~96%, the third AOR is 96%, the fourth AOR is 16%, the fifth AOR is 16~96%, the sixth AOR is 96%, the seventh AOR is 16%, the eighth AOR is 16~96% and the ninth AOR is 96%.

The first AOFF is 8%, the second AOFF is 8~48%, the third AOFF is 48%, the fourth AOFF is 8%, the fifth AOFF is 8~48%, the sixth AOFF is 48%, the seventh AOFF is 8%, the eighth AOFF is 8~48% and the ninth AOFF is 48%.

In the present embodiment, the first to third AOFFs are substantially the same as the fourth to sixth AOFFs. When the first to third AOFFs are substantially the same as the fourth to sixth AOFFs, the AOFF does not change even if the user changes the mode from the NS mode to the HS mode. Thus, when the user changes the mode from the NS mode to the HS mode, a seamless mode conversion in which the flicker is not recognized to the user is possible.

In the present embodiment, the fourth to sixth AOFFs are substantially the same as the seventh to ninth AOFFs. When the fourth to sixth AOFFs are substantially the same as the seventh to ninth AOFFs, the AOFF does not change even if the driving frequency is changed from a first frequency (e.g. 60 Hz) to a second frequency (e.g. 120 Hz) in the HS mode. Thus, even if the driving frequency is frequently changed in the HS mode, a seamless frequency conversion in which the flicker is not recognized to the user is possible.

FIG. 20 is a table illustrating AID CYCLEs determined by the driving controller 200 of FIG. 1 according to the driving mode, the driving frequency and the luminance.

In FIG. 20, the seventh AID CYCLE (4-CYCLES) may be same as the fourth AID CYCLE (4-CYCLES), the eighth AID CYCLE (4-CYCLES) may be same as the fifth AID CYCLE (4-CYCLES) and the ninth AID CYCLE (4-CYCLES) may be same as the sixth AID CYCLE (4-CYCLES). In contrast, the seventh AID CYCLE (4-CYCLES) may be different from the first AID CYCLE (2-CYCLES), the eighth AID CYCLE (4-CYCLES) may be different from the second AID CYCLE (2-CYCLES) and the ninth AID CYCLE (4-CYCLES) may be different from the third AID CYCLE (2-CYCLES).

In FIG. 20, the first AID CYCLE is two, the second AID CYCLE is two, the third AID CYCLE is two, the fourth AID CYCLE is four, the fifth AID CYCLE is four, the sixth AID CYCLE is four, the seventh AID CYCLE is four, the eighth AID CYCLE is four and the ninth AID CYCLE is four.

The first AOR is 16%, the second AOR is 16~96%, the third AOR is 96%, the fourth AOR is 8%, the fifth AOR is 8~48%, the sixth AOR is 48%, the seventh AOR is 16%, the eighth AOR is 16~96% and the ninth AOR is 96%.

The first AOFF is 8%, the second AOFF is 8~48%, the third AOFF is 48%, the fourth AOFF is 4%, the fifth AOFF is 4~24%, the sixth AOFF is 24%, the seventh AOFF is 4%, the eighth AOFF is 4~24% and the ninth AOFF is 24%.

In the present embodiment, the fourth to sixth AOFFs are substantially the same as the seventh to ninth AOFFs. When the fourth to sixth AOFFs are substantially the same as the seventh to ninth AOFFs, the AOFF does not change even if the driving frequency is changed from a first frequency (e.g. 60 Hz) to a second frequency (e.g. 120 Hz) in the HS mode. Thus, even if the driving frequency is frequently changed in the HS mode, a seamless frequency conversion in which the flicker is not recognized to the user is possible.

According to the present embodiment, the number of light emission AID CYCLEs of the emission signal EM may be properly varied according to the luminance range of the display image or the ratio AOR of the turned-off gate lines among the total gate lines. Thus, the color shift generated when the luminance is changed may be effectively controlled and the EMI characteristics and the power consumption may be optimized.

In addition, the number of light emission AID CYCLEs of the emission signal EM may be properly varied according to the driving mode, the driving frequency and the luminance. Thus, the switching flicker generated when the driving mode is switched may be prevented and the display quality characteristics for the frequencies and the luminance ranges may be enhanced.

According to the present inventive concept as explained above, the display quality of the display panel may be enhanced.

The foregoing is illustrative of the present inventive concept and is not to be construed as limiting thereof. For example, although a few embodiments of the present inventive concept have been described, those skilled in the art will readily appreciate that many modifications are possible in the embodiments without departing from the scope of the present inventive concept. Accordingly, all such modifications are intended to be included within the scope of the present inventive concept as described herein and set forth in the claims.

What is claimed is:

1. A display apparatus, comprising:

a display panel comprising an emission fine and a pixel electrically connected to the emission line;

an emission driver configured to output an emission signal to the emission line; and a driving controller configured to determine a light emission cycle, wherein the light emission cycle is a number of light emissions in a single frame of the emission signal, wherein the driving controller is configured to determine the light emission cycle according to a driving mode including a first mode and a second mode different from the first mode, a driving frequency including a first frequency and a second frequency greater than the first frequency and a luminance including a high luminance range, a middle luminance range and a low luminance range and to determine an off ratio, wherein the off ratio is a ratio of turned-off gate lines to a total number of the gate lines, wherein the first mode is a normal speed mode in which the display panel is driven in a fixed driving frequency which is the first frequency and the second mode is a high speed mode in which the display panel is driven in varied driving frequencies which are the first frequency and the second frequency, wherein the driving controller is configured to determine the off ratio dynamically in real-time based on a luminance level detected from user-defined luminance settings and grayscale values of input image data, such that the off ratio determination is adjusted dynamically without retrieving predefined values from a stored table, wherein the driving controller is configured to determine a first light emission cycle corresponding to the first mode, the first frequency and the high luminance range, a second light emission cycle corresponding to the first mode, the first frequency and the middle luminance range and a third light emission cycle corresponding to the first mode, the first frequency and the low luminance range, wherein the driving controller is configured to determine a fourth light emission cycle corresponding to the second mode, the first frequency and the high luminance range, a fifth light emission cycle corresponding to the second mode, the first frequency and the middle luminance range and a sixth light emission cycle corresponding to the second mode, the first frequency and the low luminance range, and wherein the driving controller is configured to determine a seventh light emission cycle corresponding to the second mode, the second frequency and the high luminance range, an eighth light emission cycle corresponding to the second made, the second frequency and the middle luminance range and a ninth light emission cycle corresponding to the second mode, the second frequency and the low luminance range.

2. The display apparatus of claim 1, wherein a first active frame having a first length and a second active frame having the first length are sequentially and continuously output in the first mode and in the first frequency.

3. The display apparatus of claim 2, wherein a first active frame having a second length less than the first length, a first off frame having the second length, a second active frame having the second length and a second off frame having the second length are sequentially and continuously output in the second mode and in the first frequency, and wherein a first active frame having the second length, a second active frame having the second length, a third active frame having the second length and a fourth active frame having the second length are sequentially and continuously output in the second mode and in the second frequency.

4. The display apparatus of claim 1, wherein the seventh light emission cycle is same as the fourth light emission cycle, wherein the eighth light emission cycle is same as the fifth light emission cycle, and wherein the ninth light emission cycle is same as the sixth light emission cycle.

5. The display apparatus of claim 4, wherein the first light emission cycle is four, the second light emission cycle is four, the third light emission cycle is four, the fourth light emission cycle is four, the fifth light emission cycle is four, the sixth light emission cycle is four, the seventh light emission cycle is four, the eighth light emission cycle is four and the ninth light emission cycle is four.

6. The display apparatus of claim 4, wherein the first light emission cycle is two, the second light emission cycle is two, the third light emission cycle is two, the fourth light emission cycle is four, the fifth light emission cycle is four, the sixth light emission cycle is four, the seventh light emission cycle is four, the eighth light emission cycle is four and the ninth light emission cycle is four.

7. The display apparatus of claim 1, wherein the seventh light emission cycle is greater than the fourth emission cycle, and wherein the eighth light emission cycle is greater than the fifth emission cycle.

8. The display apparatus of claim 7, wherein the first light emission cycle is four, the second light emission cycle is four, the third light emission cycle is four, the fourth light emission cycle is two, the fifth light emission cycle is four, the sixth light emission cycle is four, the seventh light emission cycle is four, the eighth light emission cycle is eight and the ninth light emission cycle is eight.

9. The display apparatus of claim 1, wherein the seventh light emission cycle is less than the fourth emission cycle, wherein the eighth light emission cycle is less than the fifth emission cycle, and wherein the ninth light emission cycle is less than the sixth emission cycle.

10. The display apparatus of claim 9, wherein the eighth light emission cycle is greater than the seventh emission cycle.

11. The display apparatus of claim 10, wherein the first light emission cycle is four, the second light emission cycle is four, the third light emission cycle is four, the fourth light emission cycle is four, the fifth light emission cycle is eight, the sixth light emission cycle is four, the seventh light emission cycle is two, the eighth light emission cycle is four and the ninth light emission cycle is two.

12. The display apparatus of claim 1, wherein the seventh light emission cycle is same as the first emission cycle, wherein the eighth light emission cycle is same as the second emission cycle, wherein the ninth light emission cycle is same as the third emission cycle, wherein the seventh light emission cycle is different from the fourth emission cycle, wherein the eighth light emission cycle is different from the fifth emission cycle, and wherein the ninth light emission cycle is different from the sixth emission cycle.

13. The display apparatus of claim 12, wherein the first light emission cycle is two, the second light emission cycle is two, the third light emission cycle is two, the fourth light emission cycle is four, the fifth light emission cycle is four, the sixth light emission cycle is four, the seventh light emission cycle is two, the eighth light emission cycle is two and the ninth light emission cycle is two.

* * * * *